United States Patent [19]

Nelson et al.

[11] 3,981,234

[45] Sept. 21, 1976

[54] APPARATUS FOR THE PREPARATION OF A SOYBEAN BEVERAGE BASE

[75] Inventors: Alvin I. Nelson, Champaign, Ill.; B. P. N. Singh; Surjan Singh, both of Uttar Pradesh, India

[73] Assignee: University of Illinois Foundation, Urbana, Ill.

[22] Filed: May 9, 1974

[21] Appl. No.: 468,269

[52] U.S. Cl. ........................... 99/483; 99/518; 99/628; 99/617; 426/507
[51] Int. Cl.² ............ A23C 3/02; A23C 9/02; A23C 13/04; A23C 15/04
[58] Field of Search ............ 99/574–575, 99/579–580, 625, 628, 537, 483, 516, 518, 617, 483, 536, 467, 470, 471, 407, 408; 241/246–247, 82.2, 186 A, 188 R; 426/436, 518, 508, 481–483, 431, 416, 352–353

[56] References Cited
UNITED STATES PATENTS

| | | | |
|---|---|---|---|
| 1,294,852 | 2/1919 | Vaughn | 99/575 |
| 2,087,492 | 7/1937 | Williams | 241/188 R |
| 2,525,581 | 10/1950 | Bierman | 99/483 X |
| 3,032,877 | 5/1962 | Collins | 99/467 X |
| 3,086,444 | 4/1963 | De Back | 99/483 |
| 3,121,015 | 2/1964 | Avera | 426/507 |
| 3,411,429 | 11/1968 | Cardona | 99/483 |
| 3,714,887 | 2/1973 | Johnson | 99/516 |

Primary Examiner—Peter Feldman
Assistant Examiner—Robert Pous
Attorney, Agent, or Firm—Mason, Kolehmainen, Rathburn & Wyss

[57] ABSTRACT

Soybean dehulling, blanching and grinding apparatus is provided for preparation of a relatively coarse ground slurry consisting of water and approximately 12% by weight of bean tissue. Soybeans having a moisture content of approximately 13% are dehulled in a rapid and efficient manner and without crushing or grinding the cotyledons. After separation from the hulls, the whole cotyledons are blanched by dropping the same in boiling water without prior soaking. The blanching apparatus blanches the cotyledons rapidly and without producing excessive foaming. The blanched soybeans are then mixed with water and ground in a horizontally positioned grinding tube by means of a series of blades which also move the product along the tube while providing a uniform mixture of bean tissue and water. A screen is provided at the end of the tube which prevents the issuance of material until the solids have a desired size, as determined by the perforations in the screen.

10 Claims, 8 Drawing Figures

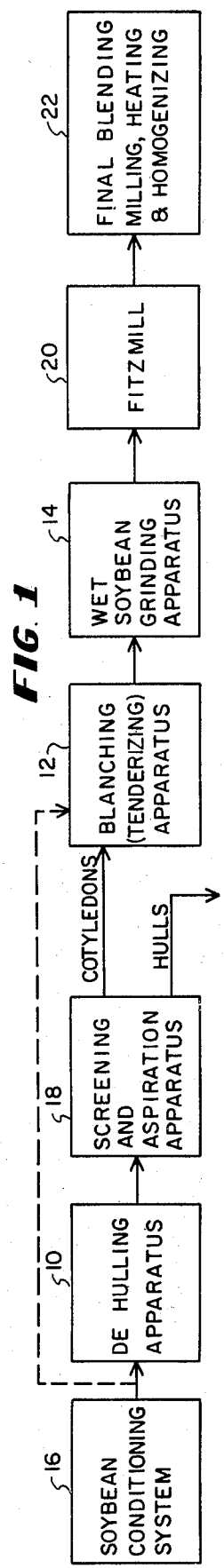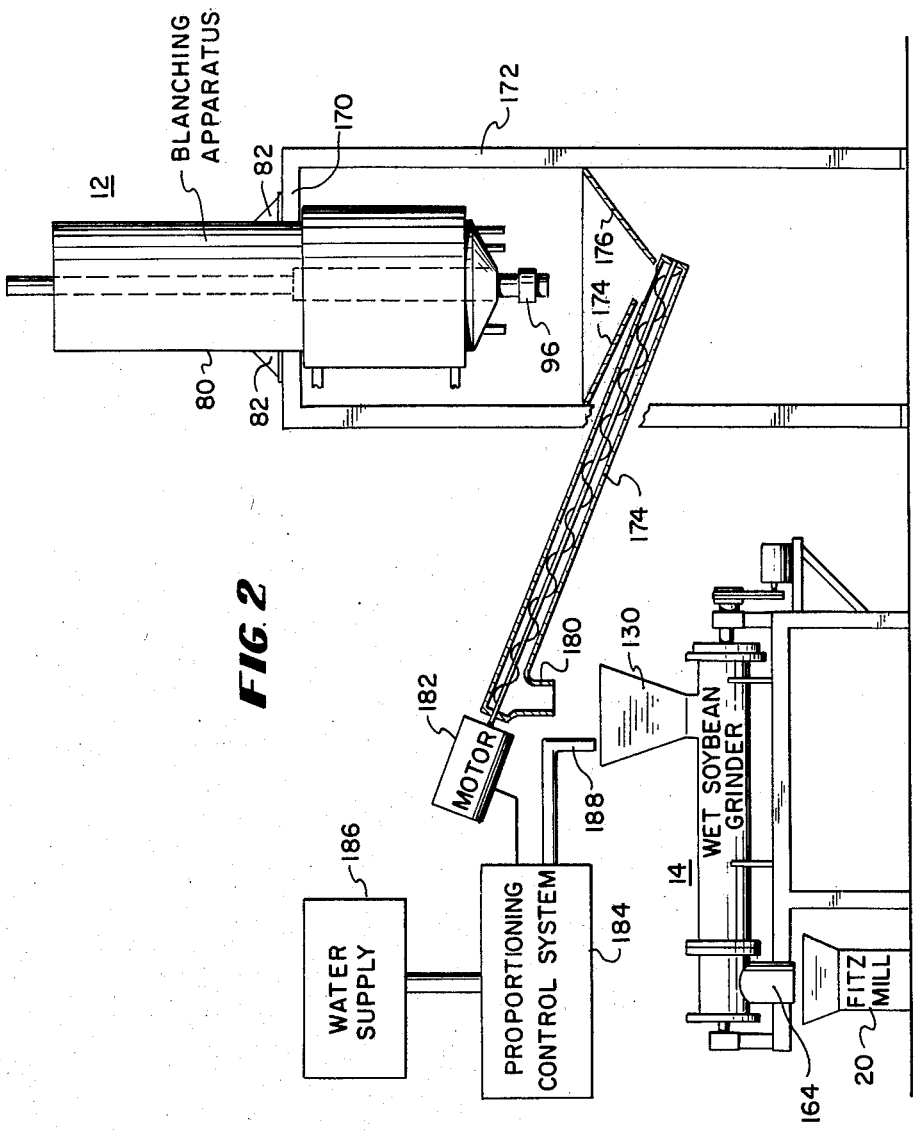

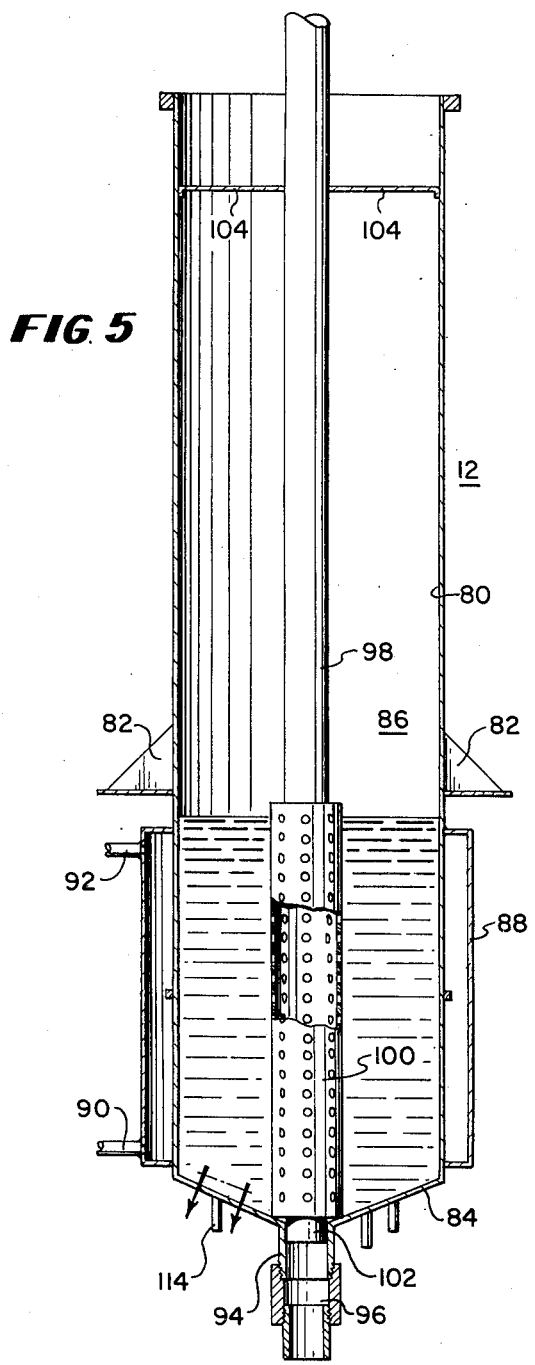
FIG. 5
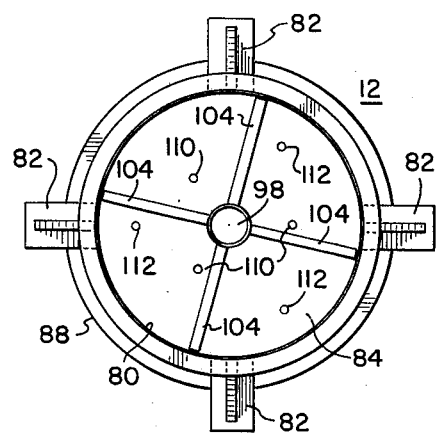
FIG. 6
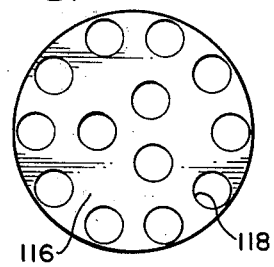
FIG. 7
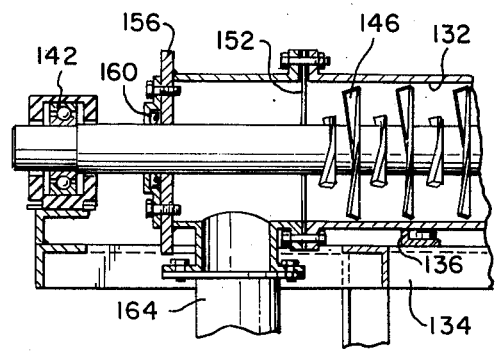
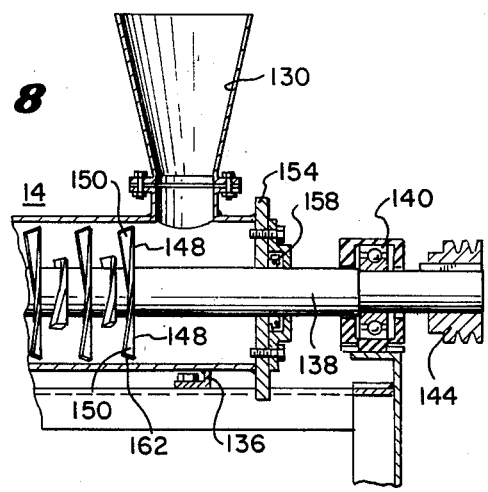
FIG. 8

APPARATUS FOR THE PREPARATION OF A SOYBEAN BEVERAGE BASE

The present invention relates to apparatus for dehulling, blanching and grinding of food products, such as, for example, the dehulling, blanching and grinding of soybeans during the preparation of a suitable soybean beverage base. While this apparatus may be employed with other food products, it is particularly suited for and will be described in connection with a soybean beverage processing arrangement such as described in a copending Nelson et al application Ser. No. 374,581 filed July 6, 1973, now Pat. No. 3,901,978.

Briefly considered, the above-identified Nelson et al application relates to a soybean beverage base which exhibits enhanced nutritional quality, flavor, stability and palatability and to processes for the preparation thereof. The apparatus of the present invention is particulaly adapted to perform certain steps of the processes described in said Nelson et al application, although it is pointed out that the apparatus of the present invention may also be employed with other similar food products. Specifically, the apparatus of the present invention may be employed to dehull relatively dry soybeans having a moisture content of approximately 13% in a rapid and efficient manner and without breaking or crushing the cotyledons, blanching the dehulled cotyledons in a rapid and efficient manner and without producing excessive foaming, and then grinding the blanched soybean cotyledons to provide a uniform output slurry consisting of approximately 12% solids by weight which is then suitable for fiurther blending, milling, heating and homogenizing.

The invention, both as to its organization and method of operation, together with further objects and advantages thereof, will best be understood by reference to the following specification taken in connection with the accompanying drawings in which:

FIG. 1 is a flow diagram, in block diagram form, of a soybean processing arrangement in which the apparatus of the present invention may be employed;

FIG. 2 is a diagrammatic side elevational view of a portion of the apparatus of FIG. 1 showing the blanching and wet soybean grinding apparatus thereof;

FIG. 5 is a sectional side elevational view of the blanching apparatus of FIG. 1;

FIG. 6 is a top view of the blanching apparatus of FIG. 5;

FIG. 7 is a fragmentary sectional view taken along the line 7—7 of FIG. 5; and

FIG. 8 is a sectional side elevational view of the wet soybean grinding apparatus of FIG. 1.

Figure 3:
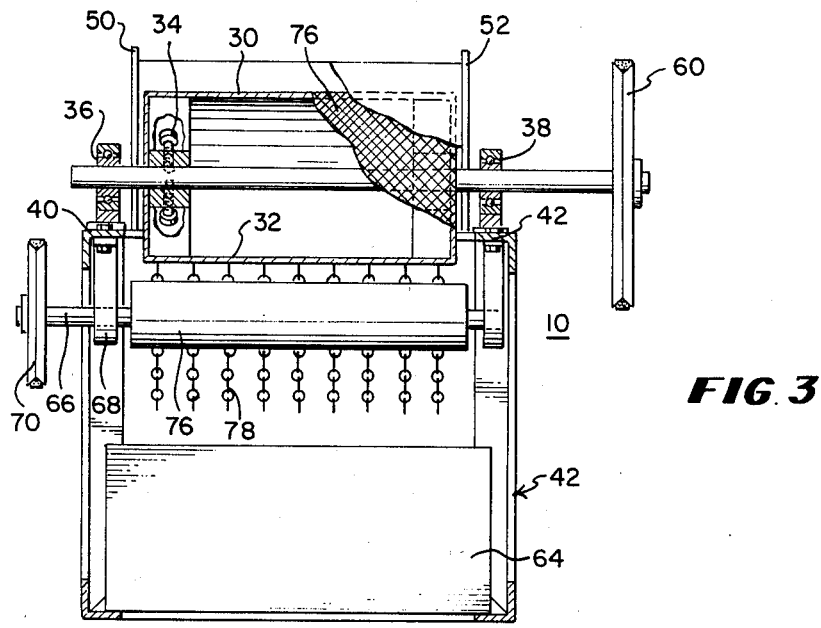
FIG. 3 is a side elevational view of the dehulling apparatus of FIG. 1.

Referring now to the drawings and more particularly to FIG. 1 thereof, the apparatus of the present invention is therein illustrated as comprising a soybean dehulling apparatus 10, a blanching and tenderizing apparatus 12 and a wet soybean grinding apparatus 14. The dehulling apparatus 10 is arranged to function with soybeans of a particular size. Accordingly, a soybean conditioning system 16 is provided ahead of the dehulling apparatus 10, the soybean conditioning system 16 preferably including a suitable screening arrangement for sizing the soybeans into two or more size categories prior to dehulling. Also, the dehulling apparatus 10 is arranged to function properly with soybeans having a moisture content of approximately 13%. This means that in the present invention soybeans generally do not require drying prior to dehulling but may simply be removed from storage, sized and supplied to the dehulling apparatus 10. However, if the moisture content of the beans is such that the hull sticks to the cotyledons, a short warm air treatment may be included in the soybean conditioning system 16 so as to reduce the moisture content slightly and loosen the hulls of the soybeans prior to supply thereof to the dehulling apparatus 10.

The dehulled soybeans from the apparatus 10 are supplied to a screening and aspiration apparatus 18 wherein the hulls and fine material are separated from the cotyledons. This fine material consists primarily of the hypocotyls, which come off first in the dehulling process, and may be used as animal feed, if desired. The intact cotyledons from the apparatus 18 are preferably dropped directly into boiling water in the blanching apparatus 12 within prior soaking, for reasons to be described in more detail hereinafter. However, if desired, the whole soybeans from the soybean conditioning system 16 may be supplied directly to the blanching apparatus 12 in the event that hulled soybeans are to be employed, as described in detail in said copending Nelson et al application.

After the cotyledons have been blanched and rinsed in the blanching apparatus 12 they are supplied to the soybean grinding apparatus 14. In this apparatus water is added to the blanched soybeans in correct proportion to provide a relatively coarse output slurry having approximately 12% solids by weight, this slurry being suitable for application to a Fitz mill 20 for further reduction in size of the solid material, as described in detail in said copending Nelson et al application. After the desired milling has been performed in the Fitz mill 20, or other similar apparatus, the fine slurry is supplied to a final blending, milling, heating and homogenizing apparatus, indicated generally at 22, as described in detail in said copending Nelson et al application.

Figure 4:
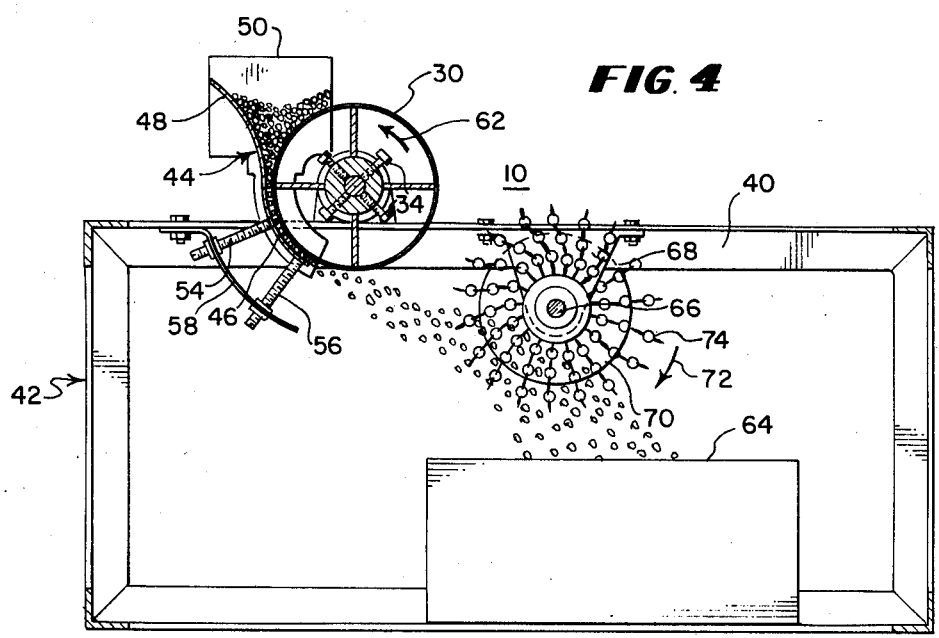
FIG. 4 is a right hand view of the dehulling apparatus of FIG. 3.

Referring now to the dehulling apparatus 10 of the present invention shown in FIGS. 3 and 4 of the drawings, a drum 30 is secured to a horizontally positioned rotatable shaft 32 by means of the set screws 34, the shaft 32 being rotatably mounted in the bearings 36 and 38 which are mounted on the upper horizontally extending members 40 of a supporting frame indicated generally indicated at 42.

Cooperating with the drum 30 is a stationary curved member indicated generally at 44, the bottom portion 46 of which is shaped to conform to the curvature of the periphery of the drum 30 so as to provide a narrow passageway between the portion 46 and the periphery of the drum 30 which is of a substantial length and is of such thickness that the beans passing between the portion 46 and the rotating drum 30 are distorted in shape. Since the soybeans supplied to the apparatus 10 are of about 13% moisture, the cotyledons thereof are resilient and are not crushed or broken. However, the hulls are readily cracked and broken and generally the cotyledons break apart from the hull upon discharging from the bottom end of the arcuate portion 46. The member 44 is also provided with an upper portion 48 which is flared outwardly to provide a supply hopper in conjunction with the curved surface of the drum 30 to which soybeans may be supplied by any suitable means such as an auger, or the like.

The member 44 is supported between side plates 50 and 52 which are positioned close to the ends of the drum so as to prevent soybeans from moving off the ends of the drum without being passed through the passageway between the portion 46 and the periphery of the drum 30. The member 44 is adjustably mounted by means of a pair of threaded support members 54 and 56 which are adjustably secured in a fixed arcuate support member 58 connected to the frame 42. Accordingly, by adjustment of the members 54, 56 relative to the support 58, the arcuate portion 46 may be moved closer to or farther away from the periphery of the drum 30 so as to adjust the dehulling apparatus for operation with soybeans of a particular size.

In order to rotate the drum 30, a pulley 60 is secured to the shaft 32 and may be driven by any suitable means (not shown) such as an electric motor, or the like. Preferably, the drum 30 is driven at a speed of approximately 300 rpm and is rotated in the direction of the arrow 62 shown in FIG. 4 so that the soybeans supplied to the apparatus 10 are moved through the passageway between the stationary curved member 46 and the periphery of the member 30 in a rolling action during which the hulls are cracked and broken. Accordingly, dehulling of the beans is accomplished almost instantly and the beans are passed through the dehulling apparatus 10 in a constant and continuous flow. However, as discussed heretofore, since the soybeans preferably have a moisture content of approximately thirteen percent, the cotyledons thereof are resilient and are not crushed or broken as they are passed through the dehulling apparatus. The dehulled cotyledons, as well as the hulls and hypocotyls are collected by any suitable means, such as the container 64, and are then supplied to suitable screening and aspiration apparatus 18 in which the hulls and hypocotyls may be separated from the whole cotyledons, as will be readily understood by those skilled in the art.

While most of the cotyledons break apart from the hull upon discharging from the machine, in some instances the cotyledons may not be held tightly within the hull but may still be loosely encased therein. In order to separate these hulls from the cotyledons loosely encased therein, a flailing apparatus may be provided between the rotating drum 30 and the container 64. More particularly, a rotatable shaft 66 is mounted on a pair of side brackets 68 which are supported from the frame members 40 and 42, a pulley 70 being secured to the end of the shaft 66 which may be driven from any suitable motive source so that the shaft 66 is rotated in the direction of the arrow 72 shown in FIG. 4. A plurality of short lengths of chain 74 are secured to the periphery of a hub member 76 which is carried by the shaft 66 and the shaft 66 is positioned so that the chains 74 move through the path of the dehulled soybeans which are discharged from the drum 30. Accordingly, the loosely encased cotyledons strike the chains 74 and the hulls are stripped therefrom prior to discharge into the container 64. Preferably the chains 74 are of relatively light material and are of relatively light weight and inertia so that impact with the discharged cotyledons does not cause breaking or crushing of the cotyledons but simply removes the loosely encased hulls therefrom. In this connection it will be understood that any other suitable arrangement may be employed for removing the hulls from loosely encased cotyledons or in the alternative the flailing members 74 may be eliminated if the hulls are suitably removed by the subsequent screening and aspiration apparatus 18. Also, if desired the surface of the drum 30 may be knurled as indicated at 76 in FIG. 3 to facilitate separation of the hulls from the cotyledons.

Considering now the blanching apparatus of the present invention shown in FIGS. 5 to 7, inclusive, it is first pointed out that while the blanching apparatus 12 is specifically designed to rehydrate and blanch soybeans, this blanching apparatus is also suitable for any product which requires blanching, precooking or parboiling and is followed by draining the blanching medium and, if desired, rinsing or washing the blanched or precooked material prior to discharging the product from the blancher. Specifically, the blanching apparatus comprises a vertically positioned cylindrical tube 80 which forms a vertically extending blanching chamber and is supported on any suitable type of supporting framework by means of the flanges 82 mounted on the sides of the cylindrical tube 80. A conical bottom wall 84 is provided for the blanching chamber 86 and a steam jacket 88 is provided around the lower portion of the tube 80 to which steam may be supplied through the inlet and exit pipes 90 and 92. The cone-shaped bottom wall 84 is provided with a central flange 94 defining a central opening which communicates with a gate valve 96 which is normally closed during operation of the blanching apparatus. A drain tube 98 is centrally positioned within the blanching chamber 86, this tube including a hollow perforated lower portion 100 which terminates in an end portion 102 of reduced diameter which fits within the flange 94 of the bottom wall, so that the central opening defined by the flange 94 is effectively closed. The lower drain tube portion 100 is provided with perforations of sufficiently small size that the cotyledons, or other product to be blanched, cannot pass through these perforations. The upper end of the drain tube 98 is centered by means of a plurality of right angle arm portions 104 which engage the inner surface of the tube 80 to center the upper end of the drain tube 98 while permitting this tube to be lifted upwardly so that the blanched product can be removed through the opening 94.

In accordance with an important feature of the invention, the cone-shaped bottom wall 84 of the blanching chamber is provided with a series of steam inlets through which steam may be injected upwardly into the blanching chamber to heat the blanch water by direct steam injection and also to provide substantial movement or mixing of the soybeans as they are blanched, as will be described in more detail hereinafter. Thus, a first series of three openings 110 are provided in the bottom wall 84 at a spacing relatively close to the center of the blanching chamber and a second group of three steam injection openings 112 are provided at a larger radius on the bottom wall 84, steam being supplied to all of the openings 110 and 112 through suitable piping 114 under the control of one or more steam injection valves. In one embodiment, the piping 114 consisted of one-half inch pipe and each of the pipe openings in the bottom wall 84 was closed by a screen member 116 (FIG. 7) provided with a plurality of small holes 118 which provide substantial openings for steam passage but prevent the material being blanched from passing into the steam injection pipes 114. For example, each of the screens 116 may have a diameter of 18.75 mm and a series of thirteen holes 118 arranged in the manner shown in FIG. 7 and each having a diameter of 3.125 mm may be employed to provide for steam passage.

In operation of the blanching apparatus of FIGS. 5 to 7, inclusive, the gate valve 96 is closed, the drain tube 98 is inserted to that the bottom end thereof closes the central opening in the bottom wall 84 and water is added to a height of approximately the upper end of the steam jacket 88. The water is then heated either by direct steam injection through the pipes 114, or by combination of steam injection through the pipes 114 and additional heat through the steam jacketed section 88 until the water within the blanching chamber 86 is boiling. When the water within the chamber 86 is boiling the cotyledons, which have been dehulled in the apparatus 10 and separated from the hulls and fines in the apparatus 18, are dropped directly into the upper end of the chamber 86 by any suitable means. Preferably these cotyledons are dropped into the boiling water without any prior soaking treatment, and it has been found that rehydration and blanching of the cotyledons can be accomplished in about 15 minutes with the apparatus 12. In this connection it will be understood that when the hulls are removed from the cotyledons a substantially increased surface area is provided for moisture movement into the bean and rehydration thereof is substantially facilitated. Also, as pointed out in said copending Nelson et al application, the blanching operation is preferably conducted on intact cotyledons in order to inactivate the lipoxidase and prevent a bean-like or painty flavor in the final product. If whole soybeans complete with hulls are supplied directly to the blanching apparatus 12, it has been found that rehydration and blanching of these soybeans can be accomplished in as short a time as 30 minutes. In both instances, the rapid rehydration and blanching time is attributed to the substantial movement or mixing of the material which is caused by the direct injection of steam through the pipes 114 in the bottom wall 84 of the blanching chamber 86.

A further feature of the blanching apparatus of the present invention is that of preventing excessive foaming during the blanching of soybeans. Soybeans contain saponins and other natural substances which cause a great deal of foaming during blanching. When soybeans are blanched in a steam jacketed kettle, the problem of foaming is severe and an attendant must be present to continually adjust the steam flow to the jacketed kettle. Also, a hard boil cannot be achieved because essentially all of the water would be eliminated by the foaming action. However, in the arrangement of the present invention the relatively high column provided in the blanching chamber 86 above the level of the water together with the direct injection of steam through the openings in the bottom wall 84 thereof combine to effect a breaking up of the foam which eliminates a difficult processing problem. Accordingly, with the blanching apparatus of the present invention, the soybeans can be blanched under vigorous boiling conditions without any foam overflowing from the blancher.

After rehydration and blanching are accomplished, the blanch water can be drained from the product by simply opening the bottom gate valve 96 and allowing the water to drain off through the perforations in the hollow drain tube portion 100. The blanched product can then be rinsed with hot or cold water to remove all blanching medium after which the drain tube 98 can be lifted upwardly or, if desired, remove completely from the blanching chamber 86, the blanched product then being removed through the open gate valve 96. If the product tends to stick to the walls of the blanching chamber 86, a few blasts of steam through the pipes 114 may be employed to facilitate removal of the blanched product through the gate valve 96.

Considering now the wet soybean grinding apparatus shown in detail in FIG. 8, it is first pointed out that this apparatus is specifically designed for initial grinding of the blanched soybeans to which water is added so that a coarse ground output slurry is produced which is a uniform mixture of ground material and water suitable for further particle size reduction in a Fitz mill, colloid mill or other apparatus, as described in detail in said copending Nelson et al application. It is also pointed out that the grinding apparatus 14 is also suitable for use with other blanched products or raw products of firm to soft texture.

The grinding apparatus 14 comprises an inlet hopper 130 the bottom end of which communicates with one end of a horizontally positioned elongated grinding tube 132, the tube 132 being supported on a suitable frame 134 by means of the supporting brackets 136. A shaft 138 is rotatably mounted in the bearings 140 and 142 and extends through the center of the grinding tube 132, the shaft 138 being provided with a pulley 144 on one end thereof so that it can be driven by a suitable driving motor or the like. Preferably the shaft 138 is driven at a speed of from 1500 to 2500 rpm to provide high capacity continuous output.

The shaft 138 carries a series of closely spaced blades 146 which are positioned transversely on the shaft 138 and alternate ones of which are arranged at 90° to the remaining blades. Each of the blades 146 is provided with cutting edges 148 on the leading edges thereof and the opposite edge of the blade is bent outwardly at an angle of approximately 30° to provide the inclined portions 150. A perforated plate 152 is provided at the exit end of the grinding tube 132 adjacent the last one of the cutting blades 146 so that the soybeans being ground are prevented from passing out of the grinder until the particle size thereof has been reduced by an amount sufficient to permit passage through the screen 152. The end walls 154 and 156 of the grinding tube 132 are suitably sealed to the shaft 138 by means of the seals 158 and 160. Also, the outer tip portions 162 of the blades 146 are curved to conform to the inner diameter of the tube 132 and are relatively closely spaced to the inner wall of this tube so that the soybean and water mixture is prevented from flowing around the tips of the blades 146 without being ground and uniformly mixed. For example the clearance between the tip portions 162 of the blades 146 and the inner wall of the tube 132 may be 1.5 mm.

Beyond the perforated screen or plate 152 a downwardly opening discharge tube 164 is provided through which the coarse ground output slurry may be discharged. In one embodiment, the grinding tube 132 had an inner diameter of 15 cm, and a series of 30 blades 146 were provided which were spaced apart approximately 1.5 cm along the length of the shaft 138, the shaft 138 being driven at a speed of approximately 2000 rpm. With this arrangement when soybeans and water are fed to the hopper 130 the cutting edges 148 of the blades 146 continually cut and break up the product and the inclined portions 150 thereof function to move the product along the length of the grinding tube 132. The product is prevented from moving out of the grinding tube 132 until the particle size is such as to allow the material to pass through the screen 152. In this specific embodiment the screen 152 was provided with 4 mm diameter holes and contained six holes per square centimeter. However, it will be understood that screens with larger or smaller holes may be employed depending upon the particle size desired in the ground material.

With the described arrangement the grinding apparatus 14 may be employed to produce a uniform coarse ground slurry of bean tissue and water. Furthermore, the grinding apparatus 14 has a sufficiently high capacity that the desired amounts of blanched soybeans and water may be continuously supplied to the hopper 130 and a uniform course ground slurry is provided at the discharge tube 164. In this connection it will be noted that by positioning the grinding tube 132 horizontally water may be supplied to the hopper 130 together with the blanched soybeans and does not immediately pass out through the perforated screen 152 but instead remains in the grinding chamber a sufficient length of time to be intimately mixed with the blanched soybeans as they are coarsely ground so that a uniform coarse ground slurry of bean tissue and water is provided in the discharge tube 164.

In accordance with a further aspect of the invention, the blanchig apparatus 12 and soybean grinding apparatus 14 may be combined in the manner shown in FIG. 2 to provide a substantially continuous type of operation. Referring to this figure, a series of blanching chambers 80 are supported by means of the flanges 82 in the upper cross members 70 of a supporting structure 172. The frame 172 also supports a plurality of inclined members 174, 176 which act as a holding bin or chute in communication with the bottom end of an auger 178. The auger 178 is provided with a discharge opening 180 arranged to discharge the blanched soybeans into the hopper 130 of the grinding apparatus 14, this auger being driven by a motor 182. In addition, a proportioning control system 184 is arranged to supply water from a supply tank 186 to a tube 188 in communication with the hopper 130 under control of a suitable metering pump so that the desired amounts of water and blanched soybeans may be continuously supplied to the hopper 130. Preferably, the proportioning control system 184 is arranged to control the metering pump from the supply 186 and the motor 182 so that the coarse ground output slurry developed in the discharge tube 164 of the grinding apparatus 14 comprises approximately twelve percent by weight of solids. This coarse ground slurry is then supplied to a suitable Fitz mill 20, or colloid mill, and after the particle size is further reduced in the Fitz mill 20 it is supplied to the final blending and homogenizing equipment 22, as described in detail in said copending Nelson et al application. If a plurality of blanchers 12 are employed the operation of these units may be timed so that they deliver blanched soybeans to the hopper 174, 176 in suitable amounts so that continuous operation of the soybean grinding apparatus 14 may be effected.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desire to secure by Letters Patent in the United States is:

1. An apparatus for blanching food products, comprising a cylindrical blanching chamber positioned so that the axis thereof extends vertically, said chamber having a central opening in the bottom end thereof, valve means for closing said central opening so that water may be introduced into said chamber, means for heating water introduced into said chamber, a plurality of inlet ports spaced around said opening in the bottom of said chamber for introducing steam into the bottom end of said chamber so that the product may be blanched under vigorous boiling conditions without the buildup of excessive foam in said chamber, a vertically extending drain member having a tubular bottom end portion adapted to fit into said central opening and prevent the product from entering said central aperture, said tubular portion being open at the bottom and having perforations of a size smaller than the diameter of the product to be blanched in the wall thereof, said drain member being vertically movable so that the bottom end portion thereof may be moved out of said central opening after the product has been blanched, thereby to permit the blanched product to be discharged through said central opening when said valve means is opened.

2. The apparatus of claim 1, wherein each of said inlet ports is provided with a screen having openings smaller than the diameter of the product to be blanched.

3. The apparatus of claim 1, wherein said inlet ports are symmetrically positioned about said vertical opening.

4. The apparatus of claim 1, including means for holding the upper end of said drain member concentric with said chamber while permitting said vertical movement thereof.

5. The apparatus of claim 1, wherein said heating means includes a steam jacket around the bottom end of said blanching chamber.

6. An apparatus for blanching food products, comprising a blanching chamber positioned so that the axis thereof extends generally vertically, said chamber having an opening in the bottom end thereof, valve means for closing said opening so that water may be retained in said chamber, means for introducing steam into said chamber so that products contained therein may be agitated during boiling thereof whereby excessive foam in said chamber is prevented, a drain member adapted to fit into said opening thereby to prevent products from entering said opening during draining of water through said opening, said drain member being movable out of said opening after the product has been blanched, thereby to permit the blanched product to be discharged through said opening when said valve means is opened.

7. The apparatus of claim 6, wherein said means for introducing steam includes a plurality of ports in a wall of said chamber, each such port being provided with a screen having openings smaller than the diameter of the product to be blanched.

8. A system for processing food products comprising, in combination: means for supplying said food products to dehulling means including a rotatable drum and means spaced therefrom for continuously dehulling such products as they are conveyed between such drum and spaced means, a cylindrical blanching chamber arranged along a vertical axis and having a cone-shaped bottom end, means for conveying the dehulled products to said blanching chamber, agitating means comprising a plurality of inlet ports in said bottom end of said chamber for introducing steam into said chamber so that the dehulled products may be blanched under vigorous boiling conditions without the buildup of excessive foam in said chamber, grinding means, and means for conveying blanched products to said grinding means, said grinding means including a grinding chamber, and a rotatable shaft means carrying blade means for grinding and conveying said product along said chamber.

9. The combination of claim 8 wherein said blanching chamber has a central bottom opening, and a vertically extending drain member having a tubular bottom portion adapted to fit in said vertical opening and prevent the product from entering therein, said tubular portion being open at the bottom and having perforations of a size smaller than the diameter of the product to be blanched in the wall thereof, said drain member being vertically movable so that the bottom end thereof may be moved out of said central opening after the product has been blanched, thereby to permit the blanched product to be discharged through said central opening.

10. The combination of claim 9 which includes means for holding the upper end of said drain member concentric with said chamber while permitting vertical movement thereof.

* * * * *